3,209,015
HALOGENATED POLYVINYL RESIN COMPOSITION PLASTICIZED WITH A MIXED ESTER OF A POLYHYDRIC ALCOHOL

Arnold G. Wilbur, Westport, Conn., assignor to Celanese Corporation of America, New York, N.Y., a corporation of Delaware
No Drawing. Original application Apr. 7, 1958, Ser. No. 726,649, now Patent No. 3,069,377, dated Dec. 18, 1962. Divided and this application June 27, 1962, Ser. No. 210,606
8 Claims. (Cl. 260—348)

This application is a division of Serial No. 726,649, filed April 7, 1958, now U.S. Patent No. 3,069,377, issued December 18, 1962.

This invention relates to novel plasticizers and more specifically concerns mixed ester plasticizers particularly adapted for plasticizing halogenated polyvinyl resins, such as polyvinyl chloride, vinyl chloride copolymers and vinylidene chloride copolymers.

An object of this invention is to provide novel plasticizers of the mixed ester type which incorporate in a single plasticizer a number of desirable properties in substantially balanced relation to each other, rather than a single desirable property in unbalanced relation to other and less desirable properties as is too often the case in known plasticizers, and particularly to provide novel plasticizers which impart high stability to halogenated vinyl resins as well as excellent physical properties.

Thus, a further object of this invention is to provide plastic compositions containing novel mixed ester plasticizers wherein the composition shows good flexibility at very low temperatures; excellent retentivity of the plasticizer despite exposure to elevated temperature or extractive agents and a high degree of stability against the degradative effects of heat and light.

This and other objects of the invention are attained through the use of a novel plasticizer comprising a mixed ester of a polyhydric alcohol having at least 2 hydroxyl groups and not more than about 8 carbon atoms, said mixed ester comprising molecules in which said polyhydric alcohol is esterified with both saturated acid residues and epoxidized acid residues, the said saturated acid residues in said mixed ester having from 4 to 8 carbon atoms in the chain, and the said epoxidized acid residues in said mixed ester having from 12 to 18 carbon atoms in the chain.

Thus, polyhydric alcohols such as pentaerythritol, erythritol, trimethylol ethane, trimethylol propane, glycerin, anhydroenneaheptitol, 1,2-propylene, glycol, and 1,2,6-hexanetriol may be esterified with saturated and unsaturated fatty acids, said acids being in a selected range of chain length and in varying relative proportions; the resultant ester being epoxidized.

It has been found that such mixed esters provide plasticizers which are particularly effective in making up halogenated vinyl resin compositions of excellent stability against degradation in that such plasticized compositions maintain flexibility at low temperatures, have good retentivity of the plasticizer and excellent electrical properties.

Thus, mixed esters of pentaerythritol such as pentaerythritol bisepoxystearate dicaproate and pentaerythritol monoepoxy stearate tricaproate were found to be particularly effective plasticizers for polyvinyl chloride compositions. Mixtures of commercially available saturated monobasic acids having average chain lengths within the indicated range and wherein substantially all the acids have chain lengths of between 3 and 10 carbon atoms, may be used in the production of said mixed esters. Where esters of alcohols having 3 or more hydroxyl groups are used, it is preferred to use saturated monobasic acids having average chain lengths between 5 and 7 and mixtures wherein substantially all the acids have chain lengths between 4 and 10.

It has been found that mixed esters having saturated monobasic acid residues with chain lengths in excess of ten carbon atoms are less compatible with the resins and tend to exude from a sheet of resin when exposed to ultra violet light or when the sheet is bent to form a loop. Mixed esters having saturated acid residues which are shorter than four carbon atoms produce compositions with high volatility losses and excessive stiffness at low temperatures.

The invention is illustrated by way of the following example:

Example I

In a 3-neck flask 340 grams of pentaerythritol was mixed with 476 grams of a mixture of saturated fatty acids composed of 60% caprylic acid and 40% capric acid and 233 grams of oleic acid, in the presence of 1.5 grams of zinc chloride catalyst, by stirring. For 30 minutes carbon dioxide was passed through the stirred slurry to free the same from oxygen. The mixture was heated with a progressive decrease in the acid number; the heating being continued for 145 minutes at which time the acid number has been reduced to 1.5.

At this point 97 ml. of the aqueous phase had collected in the Dean and Stark trap with which the flask was provided, the aqueous phase having an acid number 1.7. Together with the aqueous phase, 25.8 grams of an oil layer had collected in the trap. The oil layer, containing fatty acids was returned to the mixture and the solution heated to 220° C. until an acid number of 0.9 had been obtained.

At this time, 454 grams of butyric acid containing 1.0 grams of zinc chloride was added to the hot reaction mixture over an interval of 1.75 hours. The acid was added until the temperature had dropped from 220–225° C. to 210–215° C. and was then heated until the temperature again reached 220–225° C. At this point the butyric acid addition was continued until the temperature fell to 210–215° C. and the cycle was repeated until the entire amount of butyric acid had been added and the heating continued thereafter for 4 hours until the acid number of the reaction mixture approached a constant value.

A steam jacketed condenser was used during the addition of the butyric acid to minimize butyric acid losses. At the end of the heating period, with an acid number of 25 for the mixture, 68.7 grams of aqueous distillate containing 19% acid (as butyric) and 40.1 grams of an oil layer had collected in the trap. The oil layer had an acid number of 348 and was discarded.

The excess acid was stripped by heating the reaction mixture to 210° C. at 4–5 mm. of mercury for 1 hour while passing carbon dioxide through the mixture. At this time 57.3 grams of distillate were collected which had an acid number of 560.

To further reduce the acid number of the reaction mixture, and also to remove some of the zinc chloride catalyst, the mixture was heated with solid potassium carbonate and decolorizing charcoal under vacuum, while carbon dioxide was used to prevent contamination with air.

The reaction product was cooled to 40° C. and filtered. The filtered product recovered gave a yield of about 85% and had an acid number of 0.6. The finished product contained approximately 0.9 mole of oleic acid and 3.1 moles average $C_6$ acid per mole of pentaerythritol.

The product was then epoxidized by a reaction in which the following reactants were mixed in the following proportions: 604 grams mixed ester (0.86 mole unsaturation); 34.1 grams acetic acid (0.66 mole acetic acid/mole of unsaturation); 88 grams 50% by weight hydrogen peroxide solution (1.5 moles $H_2O_2$/mole C=C); 15 grams of a sulfonic acid type of cation exchange resin (50–100 mesh); and 186 grams of benzene.

The hydrogen peroxide was added over a 1 minute interval to the remainder of the reactants. The reaction took place over a period of 1.5 hours, with the temperature not being permitted to rise above about 80° C. The reaction was then discontinued and the reaction product was washed with hot water; then with a hot 5% by weight sodium hydroxide solution and then freed of alkali by washing with hot dilute sodium chloride solution.

The product was then stripped of solvent and water by heating for 30 minutes at 100–105° C. at 8–10 mm. of mercury and the stripped product was filtered through a bed of diatomaceous earth. The finished product representing substantially an average pentaerythritol monoepoxystearate tricaproate had the following properties:

| | |
|---|---|
| Acid number | 0.08 |
| Iodine number | 0.25 |
| Saponification number | 331 |
| Hydroxyl content, wt. percent | 0.17 |
| Oxirane oxygen content, wt. percent | 2.06 |
| Color (Gardner) | 1 |
| Density | 0.9853 |
| Viscosity, centripoises at 25° C. | 102 |

*Example II*

279.6 grams of pentaerythritol was mixed with 390 grams of the mixture of saturated fatty acid used in Example I; 576 grams of a tall oil fraction containing about 50% oleic acid, 48% linoleic acid and 2% saturated acids; and 2.4 grams of zinc chloride, the mixture being reacted over a period of 1.6 hours at a temperature of 230–240° C., using carbon dioxide to prevent contamination, and a steam jacketed Vigreaux column to return volatile products. The acid number of the product was 4.6.

At this time, 377.5 grams of butyric acid was added over a period of 1.3 hours, at a temperature of 230° C. The reaction was continued for 3 more hours and the excess butyric acid was then distilled off at a maximum temperature of 245° C. and 8 mm. of mercury. The product was cooled and at 180° C. 10 grams of potassium carbonate was added; and at a temperature of 140° C., 20 grams of decolorizing charcoal and 20 grams of fuller's earth were added. After cooling to room temperature, the product was filtered.

The ester thus produced was epoxidized in a manner similar to that indicated in Example I, using 500 grams to the ester, 31.5 grams of acetic acid; 90 grams of 50% hydrogen peroxide; 4 grams of the cationic exchange resin used in Example I and 157 grams of cyclohexane. The final product, representing substantially an average pentaerythritol monoepoxystearate tricaproate had the following properties:

| | |
|---|---|
| Acid number | 0.15 |
| Saponification number | 338 |
| Iodine number | 0.83 |
| Oxirane oxygen, wt. percent | 2.5 |
| Hydroxyl content, wt. percent | 0.38 |
| Viscosity, c.p.s., 25° C. | 142.9 |
| Specific gravity, 25/25° C. | 0.9999 |
| Color (Gardner) | 1.0 |

*Example III*

10 moles of a tall oil fraction containing about 50% oleic acid, 48% linoleic acid and 2% saturated acids and 5 moles of pentaerythritol were heated in the absence of catalyst at 200° C. for 17 hours, using nitrogen to facilitate removal of water and minimize color build-up. At the end of this period the acid number of the reaction mixture was 3.2. The temperature was then raised to 230° C. and heating continued for 6 hours, at which time the acid number was 1.0.

475 grams of butyric anhydride (3.0 moles) was added over a period of 1.7 hours to a boiling solution of 665 grams of the foregoing pentaerythritol ester (1.0 mole) in 251 grams of pyridine. During the addition of the anhydride, the temperature of the reaction mixture was allowed to rise from 136° C. to 150° C. and was kept at this temperature for 2.75 hours. The ester was then freed from volatile components by vacuum stripping at 3–5 mm. of mercury up to 165° C. The stripped ester was repeatedly washed with warm 5% aqueous solution of sodium hydroxide and washed until neutral with 2–5% sodium solution. The ester was then dried by vacuum stripping.

The resultant dibutyrate ester was epoxidized at 80° C. Thus, 600 grams of the ester was reacted with 191 grams of 50% hydrogen peroxide, 58.3 grams of acetic acid, 25 grams of the cationic exchange resin used in Example I (10% on weight of peroxide and acetic acid), and 222 grams of benzene. The reaction was terminated at 2.25 hours; the product being washed with warm sodium hydroxide solutions and then with warm sodium chloride solutions. During washing the phases separated readily and the epoxidized material was dried and freed of solvent by stripping and clarified by filtration through a bed of diatomaceous earth. The final product, pentaerythritol bisepoxystearate dibutyrate had the following properties:

| | |
|---|---|
| Acid number | 0.2 |
| Iodine number | 1.3 |
| Saponification number | 266 |
| Hydroxyl content, wt. percent | 0.68 |
| Oxirane oxygen content, wt. percent | 4.24 |
| Color (Gardner) | 3.5 |
| Density, 25/25° C. | 1.012 |
| Viscosity, centipoises at 25° C. | 384 |

The foregoing products of Examples I, II and III were compounded with polyvinyl chloride homopolymer in the proportion of 50 parts of the plasticizer to 100 parts of the vinyl resin, 1.5 parts of barium-cadmium vinyl stabilizer and 0.5 parts of stearic acid being added to the compositions. The compositions were identified as A, B and C respectively and compared to similar compositions D and E in which the plasticizer is replaced by equal amounts of epoxidized pentaerythritol tetra ester of a tall oil fraction containing about 50% oleic acid, 49% linoleic acid, 2% saturated acids; and an epoxidized soybean oil, respectively.

A tabulation of the properties of formulations follows:

| Formulation | A | B | C | D | E |
|---|---|---|---|---|---|
| Specific Gravity | 1.24 | 1.24 | 1.25 | 1.25 | 1.25 |
| Hardness, Shore A @ 23° C. and 50% RH: | | | | | |
| Instantaneous reading | 93 | 93 | 95 | 96 | 95 |
| 10 Second reading | 84 | 85 | 86 | 89 | 87 |
| Modulus @ 100% elongation @ 23° C. and 50% RH, p.s.i. (ASTM D 638-52T) | 1,500 | 1,600 | 1,800 | 1,900 | 1,750 |
| Ultimate tensile strength @ 23° C. and 50% RH, p.s.i. (ASTM D 638-52T) | 2,550 | 2,750 | 2,850 | 2,700 | 2,850 |
| Ultimate elongation @ 23° C. and 50% RG, percent (ASTM D 638-51T) | 340 | 370 | 380 | 350 | 390 |
| Low Temperature flexibility, Clash and Berg, $T_f$, ° C. (ASTM D 1043-51) | −26 | −23 | −11 | −8 | −14 |
| Volatility: Loss in activated carbon 24 hrs. @ 70° C. percent (ASTM D 1203-55) | 0.7 | 0.9 | 0.8 | 0.7 | 0.7 |
| Extraction: | | | | | |
| Loss in water [1], 24 hours @ 70° C., percent | 0.4 | 0.2 | 0.5 | 0.5 | 0.6 |
| Loss in soapy water [1], 24 hours @ 70° C., percent | 1.4 | 1.7 | 1.7 | 0.3 | 1.4 |

[1] On strip measuring 1½″ x 4″ x 0.020″.

It is to be noted that formulations A and B, representing the preferred mixed esters, show excellent low temperature flexibility, while being substantially equivalent in other desirable properties to epoxidized pentaerythritol tall oil ester and to epoxidized soybean oil. Formulation C, representing the less preferred class of mixed esters with acid chain lengths at the lower limiting value, has good low temperature flexibility and is excellent in other respects.

It is to be understood that while the invention has been described in detail with respect to the plasticization of polyvinyl chloride, it is applicable to other halogenated vinyl resins including vinylidene chloride-vinyl chloride copolymers and vinyl chloride-vinyl acetate copolymers.

It is understood that the mixed esters of the instant invention may be used in varying proportion to the polyvinyl chloride or other halogenated vinyl resin, and may range from about 5 to about 100 parts of the plasticizer to 100 parts of the resin, and preferably from about 10 to about 50 parts of plasticizer to 100 parts of resin.

It is also understood that the mixed esters of the instant invention may be formed by the use of a single saturated monobasic acid. With pentaerythritol as the polyhydric alcohol, the optimum average chain length for the saturated fatty acid has been found to be 6 carbon atoms. Mixtures of commercially available fatty acids may be used to yield the desired average chain length. In the case of trimethylolpropane as the polyhydric alcohol, the optimum average chain length for the saturated fatty acid is about 7 carbon atoms. It may, in some cases, be desirable to start with a commercial mixture of alkanoic acids having chain lengths of 8 and 10 carbon atoms and mix this commercial material with shorter chain alkanoic acid to provide a mixture of alkanoic acids having an average chain length of about 6 carbon atoms.

Mixed esters of a polyhydric alcohol with $n$ hydroxy groups may contain from 1 to $n-1$ saturated fatty acid residues and conversely from $n-1$ to 1 epoxidized acid residues. Within this range esters which have more epoxidized acid residues than saturated acid residues produce compositions with better resistance to degradation at elevated temperatures, however, within the concentration limits commonly used in plastic compositions, even the monoepoxy acid esters impart substantially stability.

The mixed esters of this invention may be used as plasticizers in combination with other plasticizer compounds, including other esters of the same polyhydric alcohols. For example, the mixed esters may be used in combination with esters containing only epoxidized acid residues, or in combination with esters containing only saturated acid residues. Such combinations may be obtained during the preparation of the desired mixed esters during the course of the distribution of the acidic residues among the polyhydric alcohol molecules. For best results, the minimum mixed ester content of the plastic composition should be not less than about 20% by weight of the entire plasticizer content.

It is understood that the mixed ester of the polyhydric alcohol may be prepared by alternative procedures. Thus, the mixed ester may be prepared by reacting the polyhydric alcohol with the saturated acids and the unsaturated acids, either in admixture or successively, in either order. The thus prepared unsaturated ester may then be epoxidized by preformed peracetic acid or other peracids, such as perbenzoic acid.

It will thus be seen that with the mixed esters of the instant invention, there have been provided novel plasticizers which upon incorporation in halogenated vinyl resin compositions such as polyvinyl chloride and the like, there is achieved a well balanced combination of properties, particularly as pertains to flexibility at low temperature; good electrical properties and relatively low volatility, as well as excellent stabilizing characteristics in respect to the halogenated resins.

It is to be understood that the preceding detailed description is by way of illustration and that changes may be made therein without departing from the spirit of the invention.

I claim:
1. An epoxidized mixed ester formed by the epoxidation of an ester of a polyhydric alcohol selected from the group consisting of pentaerythritol, erythritol, trimethylolethane, trimethylolpropane, anhydroenneaheptitol and 1,2,6-hexanetriol having esterifiable hydroxyl groups which are reacted with at least one even carbon numbered saturated fatty acid selected from the group consisting of butyric acid, caprylic acid and butyric anhydride, capric acid, and at least one unsaturated fatty acid selected from the group consisting of oleic acid and linoleic acid, said epoxidized ester being substantially free of residual unsaturation.

2. The epoxidized mixed ester of claim 1 wherein the polyhydric alcohol is pentaerythritol.

3. The epoxidized mixed ester of claim 2 wherein the saturated acids consist of a mixture of caprylic, capric and butyric acids and the unsaturated acid is oleic acid.

4. The epoxidized mixed ester of claim 2 wherein the saturated acids consist of a mixture of caprylic, capric and butyric acids and the unsaturated acids consist of a mixture of oleic and linoleic acids.

5. The epoxidized mixed ester of claim 2 wherein the said pentaerythritol is reacted with butyric anhydride and unsaturated fatty acids consisting of a mixture of oleic acid and linoleic acid.

6. The epoxidized mixed ester of claim 3 wherein the said mixed ester is formed by the reaction of about 340 parts by weight of pentaerythritol with (1) about 476 parts by weight of a mixture of saturated acids consisting of 60% caprylic acid and 40% capric acid, (2) about 233 parts by weight of oleic acid, and (3) about 454 parts by weight of butyric acid, the resulting ester then, being epoxidized until it is substantially free of residual unsaturation and contains about 2.06% oxirane oxygen.

7. The epoxidized mixed ester of claim 4 wherein the said mixed ester is formed by the reaction of about 279 parts by weight of pentaerythritol with (1) about 390 parts by weight of a mixture of saturated fatty acids consisting of 60% caprylic acid and 40% capric acid, (2) about 576 parts by weight of a tall oil fraction containing a mixture of unsaturated fatty acids consisting of 50% oleic acid, 48% linoleic acid and 2% saturated acids and (3) about 377 parts by weight of butyric acid, the resulting ester then being epoxidized until it is substantially free of residual unsaturation and contains about 2.50% oxirane oxygen.

8. The epoxidized mixed ester of claim 5 wherein the said mixed ester is formed by the reaction of 5 moles of pentaerythritol with 3 moles of butyric anhydride and 10 moles of a tall oil fraction containing a mixture of unsaturated fatty acids consisting of 50% oleic acid, 48% linoleic acid and 2% saturated acids, the resulting ester then being epoxidized until it is substantially free of residual unsaturation and contains about 4.24% oxirane oxygen.

References Cited by the Examiner

UNITED STATES PATENTS

| | | | |
|---|---|---|---|
| 2,485,160 | 10/49 | Niederhauser et al. | 260—348 |
| 2,895,966 | 7/59 | Ault et al. | 260—348 |
| 2,898,348 | 8/59 | Swern et al. | 260—348 |
| 2,962,419 | 11/60 | Minich | 260—410.6 |
| 2,978,463 | 4/61 | Kuester et al. | 260—348 |
| 3,051,729 | 8/62 | Hansen et al. | 260—348 |

FOREIGN PATENTS 811,852  4/59  Great Britain.

WALTER A. MODANCE, *Primary Examiner.*

NICHOLAS S. RIZZO, *Examiner.*